US012764464B2

(12) United States Patent
An et al.

(10) Patent No.: US 12,764,464 B2
(45) Date of Patent: Oct. 13, 2026

(54) ELECTRONIC DEVICE AND METHOD FOR CONTROLLING AUDIO SIGNAL OUTPUT USING THE SAME

(71) Applicant: Samsung Electronics Co., Ltd., Suwon-si (KR)

(72) Inventors: Jungyeol An, Suwon-si (KR); Gangyoul Kim, Suwon-si (KR); Choonho Kim, Suwon-si (KR); Youngbae Park, Suwon-si (KR); Myungcheol Lee, Suwon-si (KR); Joonrae Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 76 days.

(21) Appl. No.: 18/821,109

(22) Filed: Aug. 30, 2024

(65) Prior Publication Data

US 2025/0097636 A1 Mar. 20, 2025

Related U.S. Application Data

(63) Continuation of application No. PCT/KR2024/012204, filed on Aug. 16, 2024.

(30) Foreign Application Priority Data

Sep. 15, 2023 (KR) ........................ 10-2023-0123057
Nov. 22, 2023 (KR) ........................ 10-2023-0163156

(51) Int. Cl.
*H04R 3/02* (2006.01)
*H04R 1/02* (2006.01)
(Continued)

(52) U.S. Cl.
CPC ............. *H04R 3/005* (2013.01); *H04R 1/028* (2013.01); *H04R 1/406* (2013.01); *H04R 3/02* (2013.01);
(Continued)

(58) Field of Classification Search
CPC ........ H04R 3/005; H04R 1/028; H04R 1/406; H04R 3/02; H04R 2430/01; H04R 2499/15
(Continued)

(56) References Cited

U.S. PATENT DOCUMENTS 7,394,480 B2 7/2008 Song
9,922,663 B2 3/2018 Chen et al.
(Continued)

FOREIGN PATENT DOCUMENTS

JP 2018063399 A 4/2018
JP 2022120553 A 8/2022
(Continued)

OTHER PUBLICATIONS

Search Report and Written Opinion dated Nov. 21, 2024 issued in International Patent Application No. PCT/KR2024/012204.

*Primary Examiner* — Ammar T Hamid
(74) *Attorney, Agent, or Firm* — Nixon & Vanderhye, P.C.

(57) ABSTRACT

An electronic device according to the disclosure may include: a display disposed around an eye of a user when being worn on a body part of the user, a plurality of microphones configured to receive an external signal, a camera, a speaker configured to reproduce a signal, at least one processor, comprising processing circuitry, and a memory. At least one processor, individually and/or collectively, may be configured to execute the instructions stored in the memory and to operate any one of a first mode or a second mode according to a designated condition, the first mode displaying a virtual space on the display and the second mode displaying a real space captured via the camera on the display. Based on the operation of one of the first mode or the second mode, at least one processor, individually and/or collectively may be configured to control the
(Continued)

electronic device to: differently determine a location of a microphone to be activated for inputting an external signal among the plurality of microphones disposed in the electronic device, may differently determine a number of microphones to be activated for inputting an external signal among the plurality of microphones disposed in the electronic device, may differently determine whether to activate functions related to amplifying or blocking an external sound, and may differently determine a direction of beamforming generation for receiving a voice signal via the microphone.

15 Claims, 8 Drawing Sheets

(51) Int. Cl.

| | |
|---|---|
| ***H04R 1/40*** | (2006.01) |
| ***H04R 3/00*** | (2006.01) |
| *H04R 1/10* | (2026.01) |

(52) U.S. Cl.
CPC ...... *H04R 2430/01* (2013.01); *H04R 2499/15* (2013.01)

(58) Field of Classification Search
USPC ...................................................... 381/92, 74
See application file for complete search history.

(56) References Cited

U.S. PATENT DOCUMENTS

| | | | | |
|---|---|---|---|---|
| 10,168,772 | B2 | 1/2019 | Kim et al. | |
| 10,359,862 | B2 | 7/2019 | Moon et al. | |
| 10,827,260 | B2 | 11/2020 | Chen | |
| 10,972,854 | B2 | 4/2021 | Jung et al. | |
| 11,256,473 | B2 | 2/2022 | Oide et al. | |
| 11,302,898 | B2 | 4/2022 | Nakamura et al. | |
| 11,483,670 | B2 | 10/2022 | Harris et al. | |
| 11,496,830 | B2 | 11/2022 | Agarwala et al. | |
| 11,589,182 | B2 | 2/2023 | Tajik | |
| 11,727,642 | B2 | 8/2023 | Nakao et al. | |
| 2015/0356981 | A1* | 12/2015 | Johnson ................... | H04R 1/46 704/231 |
| 2024/0098409 | A1 | 3/2024 | Goldberg | |

FOREIGN PATENT DOCUMENTS

| | | | |
|---|---|---|---|
| JP | 2023500658 | A | 1/2023 |
| KR | 100565309 | B1 | 3/2006 |
| KR | 20170042877 | A | 4/2017 |
| KR | 10-2018-0044077 | | 5/2018 |
| KR | 20180099182 | A | 9/2018 |
| KR | 10-2021-0035725 | | 4/2021 |
| KR | 10-2022-0022315 | | 2/2022 |
| KR | 10-2023-0112688 | | 7/2023 |
| WO | 2019012817 | A1 | 1/2019 |
| WO | 2020053412 | A1 | 3/2020 |
| WO | 2021087516 | A1 | 5/2021 |

* cited by examiner

ELECTRONIC DEVICE AND METHOD FOR CONTROLLING AUDIO SIGNAL OUTPUT USING THE SAME

CROSS-REFERENCE TO RELATED APPLICATIONS

This application is a continuation of International Application No. PCT/KR2024/012204 designating the United States, filed on Aug. 16, 2024, in the Korean Intellectual Property Receiving Office and claiming priority to Korean Patent Application Nos. 10-2023-0123057, filed on Sep. 15, 2023, and 10-2023-0163156, filed on Nov. 22, 2023, in the Korean Intellectual Property Office, the disclosures of each of which are incorporated by reference herein in their entireties.

BACKGROUND

Field

The disclosure relates to an electronic device and an audio signal output control method using the same.

Description of Related Art

Recently, as technology has developed, electronic devices have departed from uniform rectangular shapes and have changed into various forms. For example, electronic devices may include a wearable electronic device capable of being worn on a body part.

The shapes of electronic devices (e.g., wearable electronic devices) are changing into diverse forms such as augmented reality (AR) glasses in a glasses shape, a head mounted display (HMD) in a head mounted shape, and the like. These electronic devices may include a plurality of sound output modules, and may output audio signals via the plurality of sound output modules.

An HMD may support a see-through mode that provides augmented reality (AR) and/or a see-closed mode that provides virtual reality (VR).

The see-through mode may compose and combine virtual objects or things on a real-world basis using the characteristics of a semipermeable lens and may augment additional information which may be difficult to acquire only based on the real world. The see-closed mode is provided in a form in which two displays are placed in front of eyes, and may enable a user to solely appreciate contents (games, films, streaming, broadcasting, or the like) provided via an external input using an independent screen, thereby providing an experience with an excellence sense of immersion.

An electronic device according to the disclosure may include, for example, a virtual see-through (VST) device. The virtual see-through (VST) device may operate by selecting one of a virtual mode that shows a virtual space to a user or a see-through mode that shows a real space.

According to a comparative example, a virtual see-through (VST) device does not perform separate controlling other than turning on/off of audio according to the virtual mode and see-through mode, and may have difficulty in providing an audio performance appropriate for the intension of a user for each mode.

SUMMARY

An electronic device according to an example embodiment the disclosure may include: a display disposed around an eye of a user based on being worn on a body part, a plurality of microphones configured to input an external signal, a camera, a speaker configured to reproduce a signal, at least one processor, comprising processing circuitry, and a memory. At least one processor, individually and/or collectively, may be configured to execute instructions stored in the memory and may be configured to: operate any one of a first mode or a second mode according to a designated condition, the first mode displaying a virtual space on the display and the second mode displaying a real space captured via the camera on the display; based on the operation of one of the first mode or the second mode, differently determine a location of a microphone to be activated for inputting an external signal among the plurality of microphones disposed in the electronic device, differently determine a number of microphones to be activated for inputting an external signal among the plurality of microphones disposed in the electronic device, differently determine whether to activate functions related to amplifying or blocking an external sound, and differently determine a direction of beamforming generation for receiving a voice signal via the microphone.

A method of operating an electronic device may include: operating one of a first mode or a second mode according to a designated condition, the first mode displaying a virtual space on a display and the second mode displaying, on the display, a real space captured by the camera; based on operation of one of the first mode or the second mode, differently determining a location of a microphone to be activated for inputting an external signal among the plurality of microphones disposed in the electronic device, differently determining a number of microphones to be activated for inputting an external signal among the plurality of microphones disposed in the electronic device, differently determining whether to activate functions related to amplifying or blocking an external sound, and differently determining a direction of beamforming generation for receiving a voice signal via the microphone.

An electronic device according to various example embodiments of the disclosure may provide an audio utilization method which is appropriate for the intention of a user, according to whether an environment where a user is currently located or a screen that the user currently views is a virtual space or a real space.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
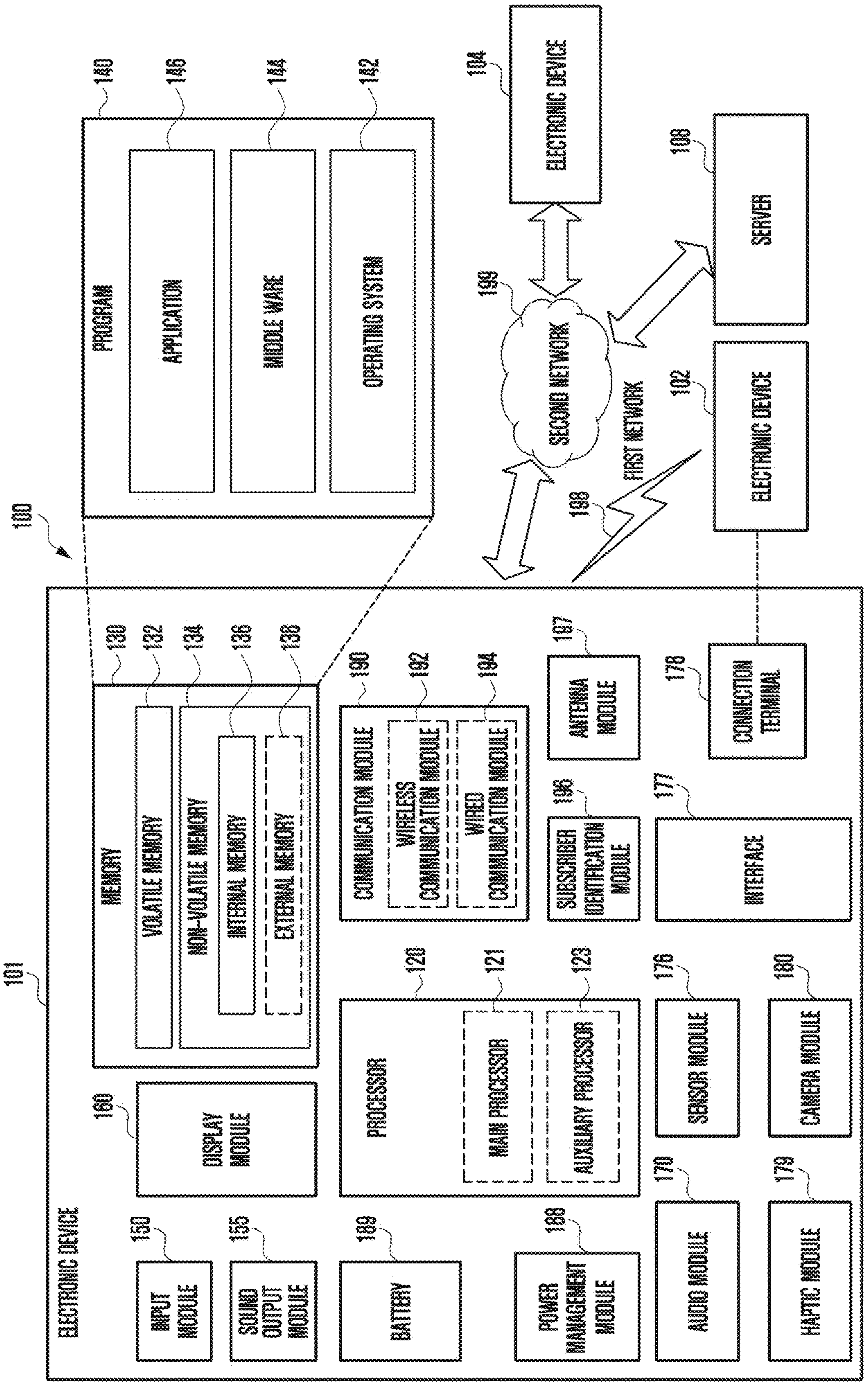
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
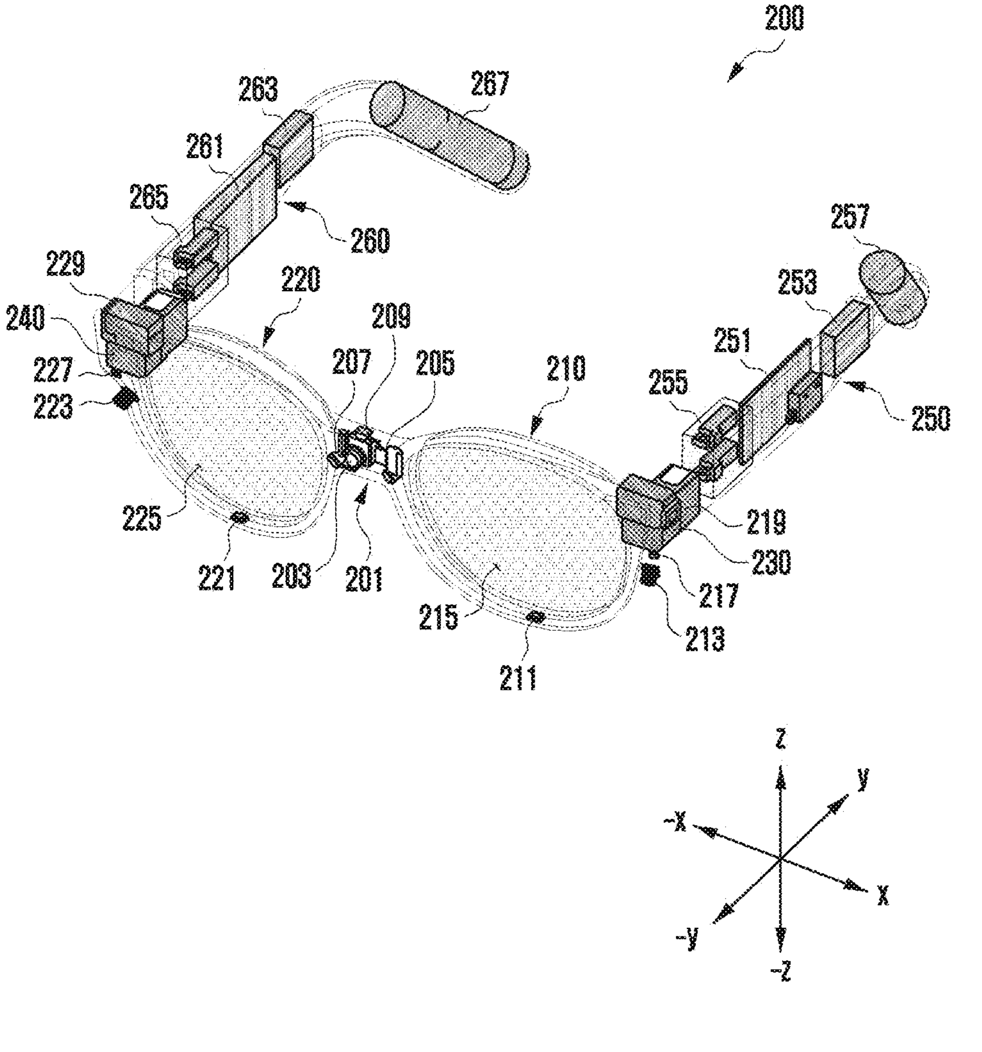
FIG. 2A is a perspective view illustrating an example structure of a wearable electronic device according to various embodiments.

FIG. 2A is a perspective view illustrating an example structure of a wearable electronic device according to various embodiments.

A wearable electronic device 200 of FIG. 2A may include embodiments described with reference to the electronic device 101 of FIG. 1. The wearable electronic device 200 may include augmented reality (AR) glasses or smart glasses provided in the form of glasses.

Referring to FIG. 2A, the wearable electronic device 200 according to various embodiments may include a bridge 201, a first rim 210, a second rim 220, a first end piece 230, a second end piece 240, a first temple 250, and/or a second temple 260.

According to an embodiment, the bridge 201 may connect the first rim 210 and the second rim 220. The bridge 201 may be located on the nose of a user in a state where the user wears the wearable electronic device 200. The bridge 201 may separate the first rim 210 and the second rim 220 based on the nose of a user.

According to various embodiments, the bridge 201 may include a camera module 203, a first sightline tracking camera 205, a second sightline tracking camera 207, and/or an audio module 209.

According to various embodiments, the camera module 203 (e.g., the camera module 180 of FIG. 1) may perform capturing in the front direction (e.g., −y-axis direction) of a user (e.g., a user of the wearable electronic device 200), and may obtain image data. The camera module 203 may capture an image corresponding to a field of view (FoV) of a user or may measure the distance to a subject (e.g., an object). The camera module 203 may include an RGB camera, a high resolution (HR) camera, and/or a photo video (PV) camera. The camera module 203 may include a color camera having an auto focus (AF) function and an optical image stabilization (OIS) function in order to obtain a high-quality image.

According to various embodiments, the first sightline tracking camera 205 and the second sightline tracking camera 207 may identify a sightline of a user. The first sightline tacking camera 205 and the second sightline tracking camera 207 may capture pupils of the user in a direction opposite to a direction in which the camera module 203 performs capturing. For example, the first sightline tracking camera 205 may partially capture the left eye of the user, and the second sightline tracking camera 207 may partially capture the right eye of the user. The first sightline tacking camera 205 and the second sightline tracking camera 207 may detect the pupils (e.g., the left eye and the right eye) of the user and may track the direction of the sightline. The tracked sightline direction may be utilized when the center of a virtual image including a virtual object moves according to the sightline direction. The first sightline tracking camera 205 and/or the second sightline tracking camera 207 may track the sightline of a user using at least one of, for example, an electro-oculography or electrooculogram (EOG) sensor, a coil system, a dual Purkinje system, bright pupil systems, or dark pupil systems.

According to various embodiments, the audio module 209 (e.g., the audio module 170 of FIG. 1) may be disposed between the first sightline tracking camera 205 and the second sightline tracking camera 207. The audio module 209 may convert the voice of a user into an electric signal, or may convert an electric signal into sound. The audio module 209 may include a microphone.

According to an embodiment, the first rim 210 and the second rim 220 may form the frame (e.g., a glasses frame) of the wearable electronic device 200 (e.g., AR glasses). The first rim 210 may be disposed in a first direction (e.g., the x-axis direction) of the bridge 201. The first rim 210 may be disposed in a location corresponding to the left eye of a user. The second rim 220 may be disposed in a second direction (e.g., −x-axis direction) of the bridge 201 which is the opposite direction of the first direction (e.g., the x-axis direction). The second rim 220 may be disposed in a location corresponding to the right eye of the user. The first rim 210 and the second rim 220 may be formed of metallic materials and/or non-conductive materials (e.g., polymer).

According to various embodiments, the first rim 210 may enclose at least part of a first glass 215 (e.g., a first display) disposed in an inner surface and may support the same. The first glass 215 may be located in front of the left eye of the user. The second rim 220 may enclose at least part of a second glass 225 (e.g., a second display) disposed in an inner surface and may support the same. The second glass 225 may be located in front of the right eye of the user. A user of the wearable electronic device 200 may view a foreground (e.g., areal image) associated with an external object (e.g., a subject) via the first glass 215 and the second glass 225. The wearable electronic device 200 may embody augmented reality by superposing a virtual image onto the foreground (e.g., a real image) associated with an external object for display.

According to various embodiments, the first glass 215 and the second glass 225 may include a projection type transparent display The first glass 215 and the second glass 225 are transparent plates (or transparent screens) and may form a reflecting surface, and an image generated by the wearable electronic device 200 may be reflected (e.g., total internal reflection) by the reflecting surface and may be incident into the left eye and the right eye of a user. According to an embodiment, the first glass 215 may include an optical waveguide that transfers light produced from a light source of the wearable electronic device to the left eye of a user. For example, the optical waveguide may be formed of glass, plastic, or polymer materials, and may include nano patterns (e.g., a polygonal or curved shape-grating structure or a mesh structure) formed inside or in the outer surface of the first glass 215. The optical waveguide may include at least one among at least one diffractive element (e.g., a diffractive optical element (DOE), a holographic optical element (HOE)) or a reflective element (e.g., a reflection mirror). The optical waveguide may guide a display light emitted from a light source to an eye of a user using the at least one diffractive element or the reflective element included in the optical waveguide. According to various embodiments, a diffractive element may include an input/output optical member, and a reflection element may include total internal reflection (TIR). For example, light emitted from a light source may be guided to the optical waveguide via an input optical member, which may be a light path, and light that moves through the optical waveguide may be guided in the direction of an eye of a user via an output optical member. The second glass 225 may be embodied in the substantially the same manner as the first glass 215.

According to various embodiments, the first glass 215 and the second glass 225 may include, for example, a liquid crystal display (LCD), a digital mirror device (DMD), a liquid crystal on silicon (LCoS), an organic light emitting diode (OLED), or a micro light emitting diode (micro LED). Although not illustrated, in the case in which the first glass 215 and the second glass 225 are embodied as one of an LCD, a DMD, or an LCoS, the wearable electronic device 200 may include a light source that emits light to a screen output area of the first glass 215 and the second glass 225. According to an embodiment, in the case in which the first glass 215 and the second glass 225 are capable of autonomously providing light, for example, in the case in which the first glass 215 and the second glass 225 are embodied as one of an OLED or a micro LED, the wearable electronic device 200 may provide a virtual image of a good quality to a user although the wearable electronic device 200 does not include a separate light source.

According to various embodiments, the first rim 210 may include a first microphone 211, a first recognition camera 213, a first light emitting device 217, and/or a first display module 219. The second rim 220 may include a second microphone 221, a second recognition camera 223, a second light emitting device 227, and/or a second display module 229.

According to various embodiments, the first light emitting device 217 and the first display module 219 may be included in the first end piece 230, and the second light emitting device 227 and the second display module 229 may be included in the second end piece 240.

According to various embodiments, the first microphone 211 and/or the second microphone 221 may receive the voice of a user of the wearable electronic device 200 and may convert the same into an electric signal.

According to various embodiments, the first recognition camera 213 and/or the second recognition camera 223 may recognize the space around the wearable electronic device 200. The first recognition camera 213 and/or the second recognition camera 223 may detect a gesture of a user within a predetermined distance (e.g., a predetermined space) from the wearable electronic device 200. The first recognition camera 213 and/or the second recognition camera 223 may include a global shutter camera that may reduce a rolling shutter (RS) phenomenon, in order to detect and track a quick hand gesture and/or a fine movement of a finger of a user. The wearable electronic device 200 may use the first sightline tracking camera 205, the second sightline tracking camera 207, the first recognition camera 213, and/or the second recognition camera 223, so as to detect an eye corresponding to a dominant eye and/or a nondominant eye among the left eye and/or the right eye of a user. For example, based on a sightline direction of a user with respect to an external object or a virtual object, the wearable electronic device 200 may detect an eye corresponding to a dominant eye and/or a nondominant eye.

According to various embodiments, the first light emitting device 217 and/or the second light emitting device 227 may emit light, in order to increase the accuracy of the camera module 203, the first sightline tracking camera 205, the second sightline tracking camera 207, the first recognition camera 213, and/or the second recognition camera 223. The first light emitting device 217 and/or the second light emitting device 227 may be used as assistant devices for increasing accuracy when capturing the pupils of a user using the first sightline tracking camera 205 and/or the second sightline tracking camera 207. In the case of capturing a gesture of a user using the first recognition camera 213 and/or the second recognition camera 223, the first light emitting device 217 and/or the second light emitting device 227 may be used as assistant devices when it is difficult to detect an object (e.g., a subject) to be captured due to a dark environment or mixing or reflection of light from various light sources. The first light emitting device 217 and/or the second light emitting device 227 may include, for example, an LED, an IR LED, or a xenon lamp.

According to various embodiments, the first display module 219 and/or the second display module 229 may emit light, and may transfer the same to the left eye and/or the right eye of a user using the first glass 215 and/or the second glass 225. The first glass 215 and/or the second glass 225 may display various image information using light emitted via the first display module 219 and/or the second display module 229. The first display module 219 and/or the second display module 229 may include the display module 160 of FIG. 1. The wearable electronic device 200 may overlap the foreground associated with an external object and an image emitted via the display module 219 and/or the second display module 229, using the first glass 215 and/or the second glass 225 for display.

According to an embodiment, the first end piece 230 may be coupled with a part (e.g., the x-axis direction) of the first rim 210. The second end piece 240 may be coupled with a part (e.g., the −x-axis direction) of the second rim 220. According to various embodiments, the first light emitting device 217 and the first display module 219 may be included in the first end piece 230. The second light emitting device 227 and the second display module 229 may be included in the second end piece 240.

According to various embodiments, the first end piece 230 may connect the first rim 210 and the first temple 250. The second end piece 240 may connect the second rim 220 and the second temple 260.

According to an embodiment, the first temple 250 may be operatively connected to the first end piece 230 using a first hinge part 255. The first hinge part 255 may be configured to be rotatable so that the first temple 250 is folded or unfolded with respect to the first rim 210. The first temple 250 may be extended, for example, along the left side of the head of a user. An end part (e.g., the y-axis direction) of the first temple 250 may be configured in a bent form so that the wearable electronic device 200 is supported, for example, by the left ear of a user in a state where the user wears the wearable electronic device 200. The second temple 260 may be operatively connected to the second end piece 240 using a second hinge part 265. The second hinge part 265 may be configured to be rotatable so that the second temple 260 is folded or unfolded with respect to the second rim 220. The second temple 260 may be extended, for example, along the right side of the head of a user. An end part (e.g., the y-axis direction) of the second temple 260 may be configured in a bent form so that the wearable electronic device 200 is supported, for example, by the right ear of a user in a state where the user wears the wearable electronic device 200.

According to various embodiments, the first temple 250 may include a first printed circuit board 251, a first sound output module 253 (e.g., the sound output module 155 of FIG. 1), and/or a first battery 257 (e.g., the battery 189 of FIG. 1). The second temple 260 may include a second printed circuit board 261, a second sound output module 263 (e.g., the sound output module 155 of FIG. 1), and/or a second battery 267 (e.g., the battery 189 of FIG. 1).

According to various embodiments, in the first printed circuit board 251 and/or the second printed circuit board 261, various electronic components (at least part of the components included in the electronic device 101 of FIG. 1), such as the processor 120, the memory 130, the interface 177, and/or the wireless communication module 192 disclosed in FIG. 1, may be disposed. The processor may include, for example, one or more among a central processing unit, an application processor, a graphic processing device, an image signal processor, a sensor hub-processor, or a communication processor. The first printed-circuit board 251 and/or the second printed circuit board 261 may include, for example, a printed circuit board (PCB), a flexible PCB (FPCB), or a rigid-flexible PCB (RFPCB). According to an embodiment, the first printed circuit board 251 and/or the second printed circuit board 261 may include a main PCB, a slave PCB disposed partially overlapping the main PCB, and/or an interposer substrate disposed between the main PCB and the slave PCB. The first printed circuit board 251 and/or the second printed circuit board 261 may be electrically connected to other components (e.g., the camera module 203, the first sightline tracking camera 205, the second sightline tracking camera 207, the audio module 209, the first microphone 211, the first recognition camera 213, the first light emitting device 217, the first display module 219, the second microphone 221, the second recognition camera 223, the second light emitting device 227, the second display module 229, the first sound output module 253, and/or the second sound output module 263) via an electric path such as an FPCB and/or a cable. For example, the FPCB and/or the cable may be disposed at least some of the first rim 210, the bridge 201, and/or the second rim 220. According to an embodiment, the wearable electronic device 200 may include only one of the first printed circuit board 251 and the second printed circuit board 261.

According to various embodiments, the first sound output module 253 and/or the second sound output module 263 may transfer an audio signal to the left ear and/or right ear of a user. The first sound output module 253 and/or the second sound output module 263 may include, for example, a piezo speaker (e.g., a bone conduction speaker) to transfer audio signals without a speaker hole. According to an embodiment, the wearable electronic device 200 may include only one of the first sound output module 253 and the second sound output module 263.

According to various embodiments, the first battery 257 and/or the second battery 267 may supply power to the first printed circuit board 251 and/or the second printed circuit board 261 using a power management module (e.g., the power management module 188 of FIG. 1). The first battery 257 and/or the second battery 267 may include, for example, a disposable primary battery, a rechargeable secondary battery, or a fuel cell. According to an embodiment, the wearable electronic device 200 may include only one of the first battery 257 and the second battery 267.

According to various embodiments, the wearable electronic device 200 may include a sensor module (e.g., the sensor module 176 of FIG. 1) including at least one sensor. The sensor module may produce an electric signal or a data value corresponding to an internal operational state of the wearable electronic device 200 or an external environment state. The sensor module may further include, for example, at least one among a gesture sensor, a gyro sensor, atmospheric pressure sensor, a magnetic sensor, an acceleration sensor, a grip sensor, a color sensor, an infrared (IR) sensor, a biometric sensor (e.g., a HRM sensor), a temperature sensor, a humidity sensor, or an illumination sensor. According to an embodiment, the sensor module may recognize biometric information of a user using various biometric sensors (or biometric recognition sensors) such as an e-nose sensor, an electromyography sensor (EMG sensor), an electroencephalogram sensor (EEG sensor), an electrocardiogram sensor (ECG sensor), or an iris sensor.

According to various embodiments, although the description has described that the wearable electronic device 200 is a device that displays augmented reality using the first glass 215 and the second glass 225, the wearable electronic device 200 is not limited thereto and may be a device that displays virtual reality (VR).

Although FIG. 2A according to various embodiments have described that the wearable electronic device 200 is a device that displays augmented reality or virtual reality using the first glass 215 and the second glass 225, the disclose is not limited thereto. For example, the wearable electronic device 200 may include a video see-through (VST) device. In this connection, various embodiments will be described in greater detail below with reference to FIG. 2B and FIG. 2C.

Figure 2B:
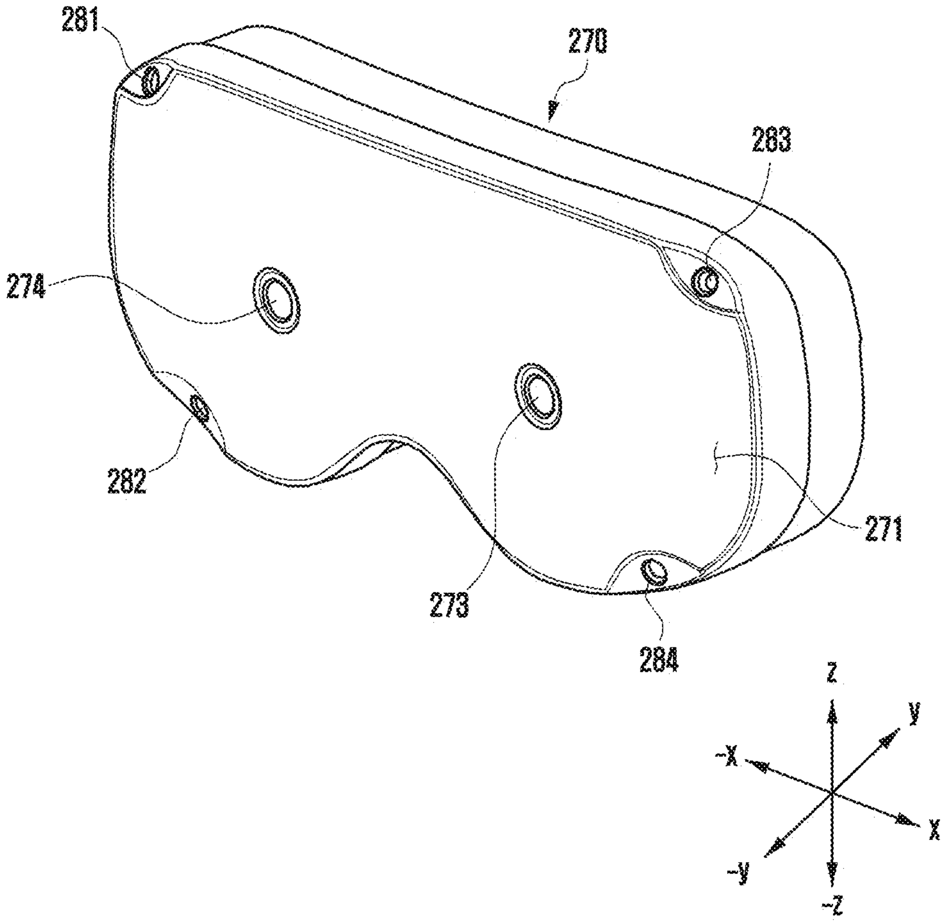
FIG. 2B is a perspective view illustrating a front side of an example wearable electronic device according to various embodiments.
Figure 2C:
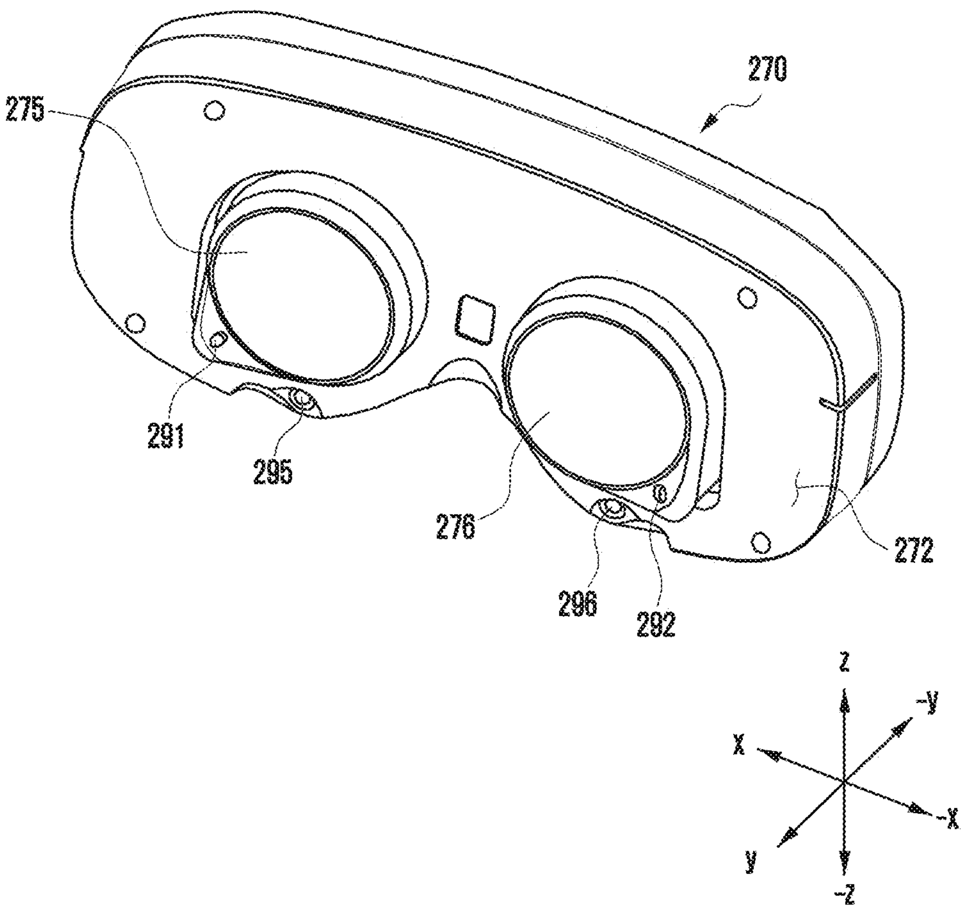
FIG. 2C is a perspective view illustrating a rear side of an example wearable electronic device according to various embodiments.

FIG. 2B is a front perspective view illustrating an example wearable electronic device 270, according to various embodiments. FIG. 2C is a rear perspective view illustrating an example wearable electronic device 270 according to various embodiments.

Referring to FIG. 2B and FIG. 2C, in the wearable electronic device 270, a plurality of cameras (e.g., a first camera 273 (e.g., the first recognition camera 213 of FIG. 2A) and a second camera 274 (e.g., the second recognition camera 223 of FIG. 2A) may be disposed in the direction of the front side of the wearable electronic device 270 (e.g., the −y direction, the direction of a sightline of a user). For example, the wearable electronic device 270 may include the first camera 273 corresponding to the left eye of a user and the second camera 274 corresponding to the right eye of the user. The wearable electronic device 270 may capture an external environment in the front side direction (e.g., −y direction) of the wearable electronic device 270 using the first camera 273 and the second camera 274. The wearable electronic device 270 may include a first side 271 (e.g., the front side) (e.g., referring to FIG. 2B) exposed to the external environment and a second side 272 (e.g., the rear side) (e.g., referring to FIG. 2C) that is not exposed to the external environment and is closely attached to the skin of a user in a state where the user wears the wearable electronic device 270. For example, when the wearable electronic device 270 is worn on the face of the user, the first side 271 of the wearable electronic device 270 is in the state of being exposed to the external environment, and the second side 272 of the wearable electronic device 270 is in the state of being attached closely and at least partially to the face of the user.

According to an embodiment, at least one distance sensor 281, 282, 283, and/or 284 may be disposed in the first side 271 of the wearable electronic device 270. For example, the at least one distance sensor 281, 282, 283, and/one 284 may measure the distance to at least one object disposed around the wearable electronic device 270. The at least one distance sensor 281, 282, 283, and/or 284 may include an infrared light sensor, an ultrasound sensor, and/or a light detection and ranging (LiDAR) sensor. The at least one distance sensor 281, 282, 283, and/or 284 may be embodied based on an infrared light sensor, an ultrasound sensor, and/or a LiDAR sensor.

Although FIG. 2B according to various embodiments illustrates that the four distance sensors 281, 282, 283, and 284 are disposed in the first side 271 of the wearable electronic device 270, the disclosure is not limited thereto.

According to an embodiment, in the wearable electronic device 270, a plurality of displays (e.g., a first display 275 (e.g., the first glass 215 of FIG. 2A) and a second display 276 (e.g., the second glass 225 of FIG. 2A) may be disposed in the direction of the rear side of the wearable electronic device 270 (e.g., the +y direction, the opposite direction of the sightline of a user). For example, the first display 275 corresponding to the left eye of a user and the second display 276 corresponding to the right eye of the user may be disposed in the second side 272 (e.g., the rear side) of the wearable electronic device 270. For example, in the case in which the wearable electronic device 270 is worn on the face of the user, the first display 275 may be disposed to correspond to the left eye of the user, and the second display 276 may be disposed to correspond to the right eye of the user.

According to an embodiment, a plurality of sightline tracking cameras (e.g., a first sightline tracking camera 291 (e.g., the first sightline tracking camera 205 of FIG. 2A) or a second sightline tracking camera 292 (e.g., the second sightline tracking camera 207 of FIG. 2A)) may be at least partially disposed in the second side 272 of the wearable electronic device 270. For example, the plurality of sightline tracking cameras 291 and 292 may track a movement of the pupils of a user. The first sightline tracking camera 291 may track a movement of the left eye of the user, and the second sightline tracking camera 292 may track a movement of the right eye of the user. According to an embodiment, based on movements of pupils tracked using the plurality of sightline tracking cameras 291 and 292, the wearable electronic device 270 may identify a direction in which the user gazes.

According to an embodiment, a plurality of face recognition cameras (e.g., a first face recognition camera 295 or a second face recognition camera 296)) may be at least partially disposed in the second side 272 of the wearable electronic device 270. For example, the plurality of face recognition cameras 295 and 296 may recognize the face of a user in the situation in which the wearable electronic device 270 is worn on the face of the user. According to an embodiment, the wearable electronic device 270 may use the plurality of face recognition cameras 295 and 296 so as to determine whether the wearable electronic device 270 is worn on the face of a user.

Figure 3:
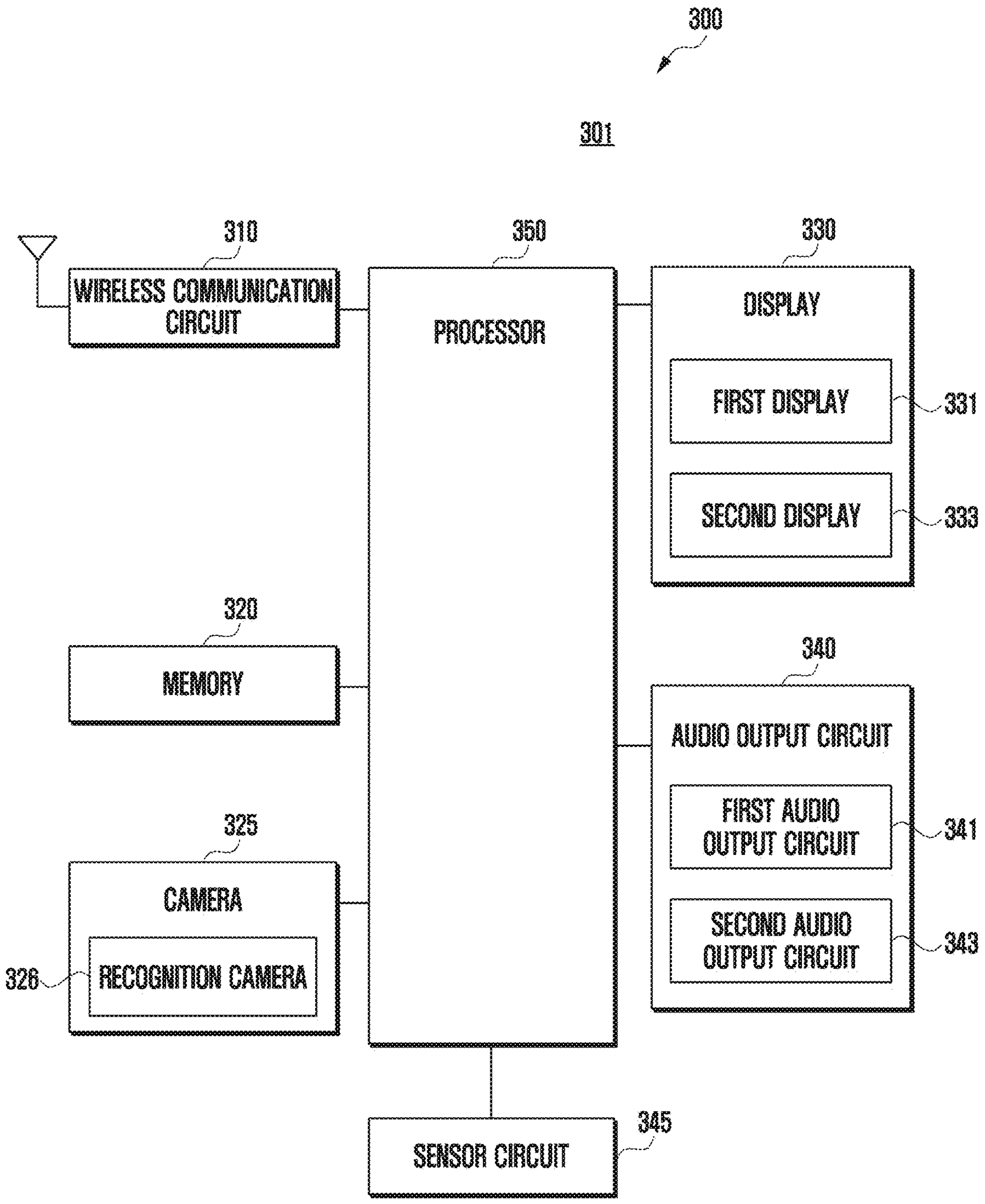
FIG. 3 is a block diagram illustrating an example configuration of an electronic device according to various embodiments.

FIG. 3 is a block diagram 300 illustrating an example configuration of an electronic device 301 according to various embodiments.

According to various embodiments, the electronic device 301, worn on a user, may operate in a stand-alone manner, and may provide an augmented reality service.

The disclosure is not limited thereto, and the electronic device 301 may be connected to an external electronic device (e.g., a smartphone) (e.g., the electronic device 102 or the electronic device 104 of FIG. 1) in a wireless or wired manner, may receive, from an external electronic device, data (e.g., rendered data) for providing an augmented reality service, and may provide, via a display (e.g., a first display 331 and/or a second display module 333), an augmented reality service based on the data for providing an augmented reality service.

According to an embodiment, the electronic device 301 may include augmented reality (AR) glasses or smart glasses provided in the form of glasses. However, the disclosure is not limited thereto.

Referring to FIG. 3, the electronic device 301 (e.g., the electronic device 101 of FIG. 1, the wearable electronic device 200 and 270 of FIG. 2A to FIG. 2C) may include a wireless communication circuit 310 (e.g., the communication module 190 of FIG. 1), a memory 320 (e.g., the memory 130 of FIG. 1), a camera 325 (e.g., the camera module 180 of FIG. 1), a display 330 (e.g., the display module 160 of FIG. 1), an audio output circuit 340 (e.g., the sound output module 155 of FIG. 1), a sensor circuit 345 (e.g., the sensor module 176 of FIG. 1), and/or a processor (e.g., including various processing circuitry) 350 (e.g., the processor 120 of FIG. 1).

According to an embodiment of the disclosure, the wireless communication circuit 310 (e.g., the communication module 190 of FIG. 1) may establish a communication channel with an external electronic device (e.g., the electronic device 102 of FIG. 1), and may support various data transmission or reception with the external electronic device.

According to an embodiment, the wireless communication circuit 310 may connect communication between the electronic device 301 and an external electronic device (e.g., a smartphone) under control of the processor 350.

According to an embodiment, in the case in which communication is performed so that the electronic device 301 is connected to an external electronic device (e.g., a smartphone) in a wired or wireless manner, and receives, from the external electronic device, data for providing an augmented reality service, the wireless communication circuit 310 may be connected to the external electronic device (e.g., the smartphone) and may transmit information associated with a gesture detected by the electronic device 301 to the external electronic device (e.g., the smart phone) under control of the processor 350. Under control of the processor 350, the wireless communication circuit 310 may receive, from the external electronic device (e.g., the smartphone), an object (e.g., a virtual object) for controlling output of an audio signal rendered by the external electronic device (e.g., the smartphone) based on the information associated with a gesture received from the electronic device 301.

According to an embodiment, in the case in which communication is performed so that the electronic device 301 is connected to an external electronic device (e.g., a smartphone) in a wired or wireless manner, and receive data for providing an augmented reality service from the external electronic device, the wireless communication circuit 310 may transmit, to the external electronic device (e.g., the smartphone) under control of the processor 350, information associated with an output mode for an audio signal and/or information associated with a volume adjustment value of an audio signal, which is determined by a user gesture. The wireless communication circuit 310 may receive, from the external electronic device (e.g., the smartphone), an audio signal corresponding to an output mode converted by the external electronic device (e.g., the smartphone) based on the information associated with the output mode for an audio signal. Under control of the processor 350, the wireless communication circuit 310 may receive, from the external electronic device (e.g., the smartphone), an audio signal of which the volume is adjusted by the external electronic device (e.g., the smartphone) based on the information associated with the volume adjustment value of an audio signal.

According to an embodiment of the disclosure, the memory 320 (e.g., the memory 130 of FIG. 1) may perform a function of storing a program (e.g., the program 140 of FIG. 1) for processing and controlling the processor 350 of the electronic device 301, an operating system (OS) (e.g., the operating system 142 of FIG. 1), various applications, and/or input/output data, and may store a program of controlling the overall operations of the electronic device 301. The memory 320 may store various instructions executable by the processor 350.

According to an embodiment, the memory 320 may store instructions to provide an augmented reality service that outputs at least one object (e.g., at least one virtual object) related to an audio signal based on execution of a music reproduction-related application.

According to an embodiment, the memory 320 may store information associated with gestures mapped to control output of an audio signal, for example, changing an output mode (e.g., directivity mode, a surround mode) for an audio signal and/or adjusting the volume of an audio signal. The memory 320 may store instructions to change an output mode (e.g., directivity mode, a surround mode) for an audio signal and/or to adjust the volume of an audio signal based on gestures detected from an object for controlling output of an audio signal. The memory 320 may store instructions to output a visual effect corresponding to a changed output mode for an audio signal and/or an adjusted volume of an audio signal.

According to an embodiment, the memory 320 may store location information of a user who wears the electronic device 301, location information associated with where an object for controlling output of an audio signal is output in a real space, and/or distance information associated with the distance between a user who wears the electronic device 301 and an output object.

According to an embodiment of the disclosure, the camera 325 (e.g., the camera module 180 of FIG. 1) may include a recognition camera 326 (e.g., the first recognition camera 213 and/or second recognition camera 223 of FIG. 2A, or the first camera 273 and/or second camera 274 of FIG. 2B). The recognition camera 326 (e.g., the first recognition camera 213 and/or the second recognition camera 223, or the first camera 273 and/or the second camera 274 of FIG. 2B) may recognize a surrounding space of the electronic device 301, and may detect a user gesture within a predetermine distance (e.g., a predetermined space).

According to an embodiment of the disclosure, the display 330 (e.g., the first display module 160 of FIG. 1) may include the first display 331 (e.g., the first glass 215 of FIG. 2A or the first display 275 of FIG. 2C), and/or the second display 333 (e.g., the glass 225 of FIG. 2A or the second display 276 of FIG. 2C).

According to an embodiment, the first display 331 may be located in front of the left eye of a user, and the second display 333 may be located in front of the right eye of the user. Accordingly, the first display 331 and/or the second display 333 may display various information, and may transfer the same to the left eye and/or the right eye of the user.

According to an embodiment, the first display 331 and/or the second display 333 may display an augmented reality space that superposes at least one object (e.g., at least one virtual object) related to an audio signal onto at least part of an image (e.g., a preview image) interoperating a real space obtained via the camera 325 for display under control of the processor 350.

According to an embodiment of the disclosure, the audio output circuit 340 (e.g., the sound output module 155 of FIG. 1) may include a first audio output circuit 341 (e.g., the first sound output module 253 of FIG. 2A) and a second audio output circuit 343 (e.g., the second sound output module 263 of FIG. 2A). However, the disclosure is not limited thereto.

According to an embodiment, the first audio output circuit 341 and/or the second audio output circuit 343 may transfer, to the left ear and/or the right ear of a user, an audio signal corresponding to an output mode (e.g., directivity mode or a surround mode) for an audio signal and/or an audio signal of which the volume is adjusted.

According to an embodiment of the disclosure, the sensor circuit 345 (e.g., the sensor module 176 of FIG. 1) may include various sensors, including, for example, and without limitation, a motion sensor (not illustrated) (e.g., an acceleration sensor, a gyro sensor, and/or a magnetic field sensor) to detect a movement (e.g., up/down/left/right head movement) of the electronic device 301 (or a user).

According to an embodiment, the sensor circuit 345 may include a location sensor (not illustrated) (e.g., a global navigation satellite system (GNSS)) to detect location information (e.g., coordinate information) of the electronic device 301.

According to an embodiment, the sensor circuit 345 may transfer, to the processor 350, information associated with a movement of the electronic device 301 obtained via a motion sensor and/or location information of the electronic device 301 obtained via a location sensor.

According to an embodiment of the disclosure, the processor 350 (e.g., the processor 120 of FIG. 1) may include, for example, a micro controller unit (MCU), and may operate an operating system (OS) or an embedded software program so as to control a plurality of hardware components connected to the processor 350. The processor 350, for example, may control a plurality of hardware components according to instructions (e.g., the program 140 of FIG. 1) stored in the memory 320. The processor 350 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

Figure 4:
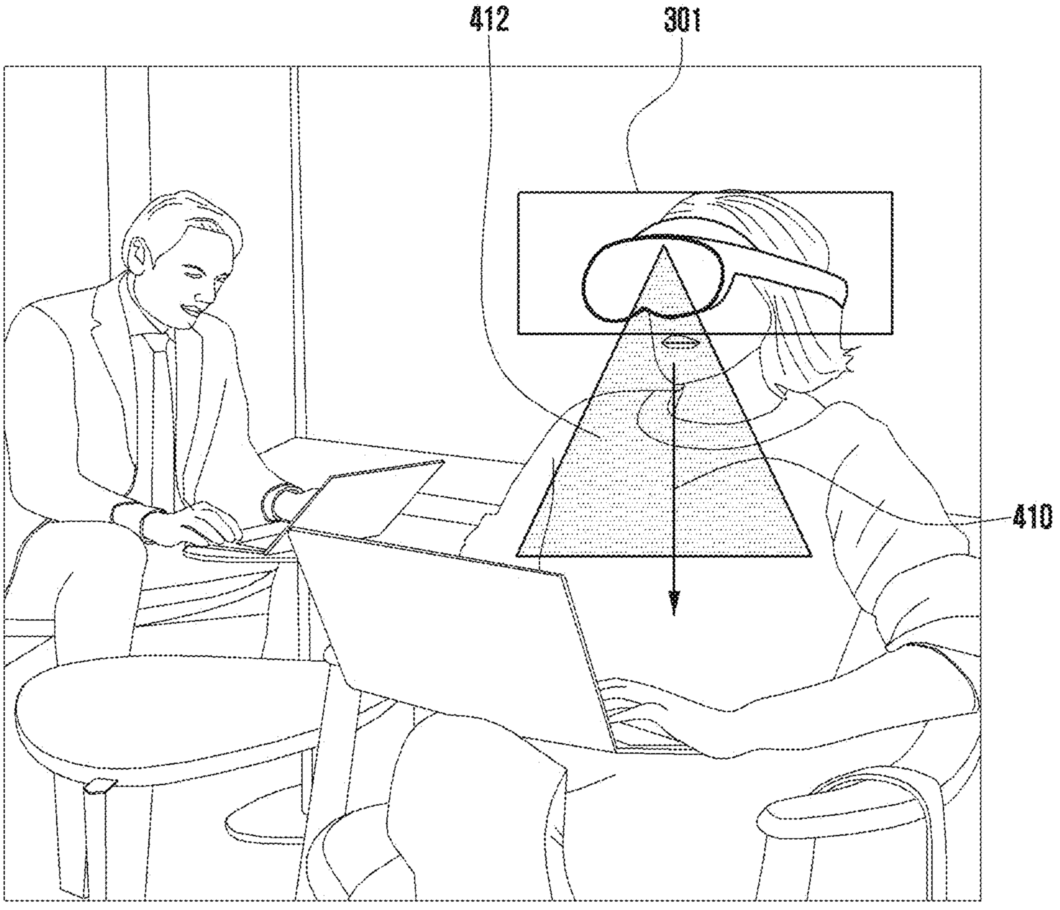
FIG. 4 is a diagram illustrating an example in which an electronic device operates in a first mode according to various embodiments.

FIG. 4 is a diagram illustrating an example in which an electronic device 301 operates in a first mode according to various embodiments.

According to an embodiment, the first mode may be a virtual mode. The virtual mode may include a mode for performing a game or a call or conference with another user in a virtual space. In the case in which the electronic device 301 operates in the first mode, a processor (e.g., the processor 350 of FIG. 3) may determine, as noise, a signal generated around a user, excluding a user voice. The processor 350 may cancel other signals excluding a signal corresponding to a user voice among the signals input to a microphone, and may activate noise cancelling. Using various methods, the processor 350 may decrease or cancel external signals input to a microphone from the surroundings.

For example, the electronic device 301 may include a plurality of microphones in the upper end and the lower end. The microphones located in a lower end of the electronic device 301 may be relatively closer to the mouth of a user. In this instance, a user voice may be input relatively earlier to a microphone disposed in a relatively lower end. The user voice may be input to a microphone disposed in an upper end after a predetermined period of time elapses. The processor 350 may perform signal amplification by delaying a signal of the lower end microphone a predetermined period of time and adding the delayed signal to a signal input to the upper end microphone.

In the case of a signal input in another direction (e.g., the front side) different from the direction of the mouth of a user, voice may be input to a lower end microphone and an upper end microphone at the same time. In this instance, a signal of the lower end microphone is delayed a predetermined period of time and is added to a signal input to the upper end microphone, the phase thereof may be inverted and the magnitude of sound may be reduced. By adding an inverted phase, the processor 350 may reduce the magnitude of sound in the case of a signal input in another direction (e.g., the front side), instead of the direction of the mouth of a user, and may amplify the magnitude of sound in the case of a signal input in the direction 412 of the mouth. In addition, the processor 350 may distinguish a signal of a user voice and other signals using a noise suppressor. The processor 350 may reduce the magnitude of sound by adding an inverted phase to a signal different from a user voice signal.

Various methods, for example, may include any one among gain adjustment, use of a filter, dynamic range compression (DRC), or noise suppression. The dynamic range compression (DRC) may be a process that adjusts or compresses a dynamic range of a music or audio signal so as to be appropriate for a predetermined purpose. This may perform control so that sound is not excessively loud or small to listen to by making the level of sound from an audio device to be regular. The noise suppression may be used to improve the quality of sound in a noisy environment, and to enhance user experience.

According to an embodiment, in the case of operation in the first mode or virtual mode, the processor 350 may activate noise cancelling in order to block an external sound, and may cancel or reduce noise received in the electronic device 301. In the case of operation in the first mode, the processor 350 may operate a microphone (e.g., a lower end microphone) disposed closest to the mouth of a user relative to the electronic device 301 in an embodiment. For example, a lower end microphone in relation to the electronic device 301 may be a microphone relatively closest to the mouth of a user. In the case of operation in the first mode, the processor 350 may operate a lower end microphone relative to the electronic device 301, and may provide a situation capable of receiving a user voice within the closest distance and/or reducing reception of noise from the outside. A lower end microphone may be, for example, the first microphone 211 and/or the second microphone 221 of FIG. 2A. An area in which a lower end microphone is disposed may be different for each device, is not a fixed area, and may be an area relatively closest to the mouth of a user among a plurality of microphones.

The processor 350 may deactivate an ambient sound listening mode so as to cancel noise received via a microphone.

According to an embodiment, the processor 350 may operate a lower end microphone and may perform control so that a beamforming generation direction of a signal output from a speaker is directed to a lower end 410.

The ambient sound listening mode may be a mode that amplifies an external sound so that a user easily listens to the sound. Active noise cancellation (ANC) may be a function that blocks external sounds, which is different from the ambient sound listening mode.

A microphone included in the electronic device 301 may be disposed around or in an ear of a user. The processor 350 may use a microphone disposed in or around an ear of a user so as to produce a signal having the opposite phase to that of an external signal, and to offset the external signal. The processor 350 may use the ANC function to block an external signal so that a user is incapable of listening to the external signal.

The noise suppressor may cancel noise for a partner with whom a user is having a call. The processor 350 may distinguish a user voice signal and other signals among the signals input to a microphone. The processor 350 may preserve a signal corresponding to a user voice, and may remove other signals different from a user voice using a noise suppressor. The processor 350 may use a noise suppressor to perform control so as to transfer only a user voice to a partner whom the user is having a call with, and not to transfer noise different from a user voice.

In the case of entry to a virtual mode, the processor 350 may deactivate the ambient sound listening function and may activate the ANC function. The processor 350 may select a microphone disposed in the direction 412 of the mouth of a user when the user is having a call with a partner, may recognize a user voice, and may cancel external noise using a noise suppressor. The external noise may be other sounds different from a user voice.

Figure 5:
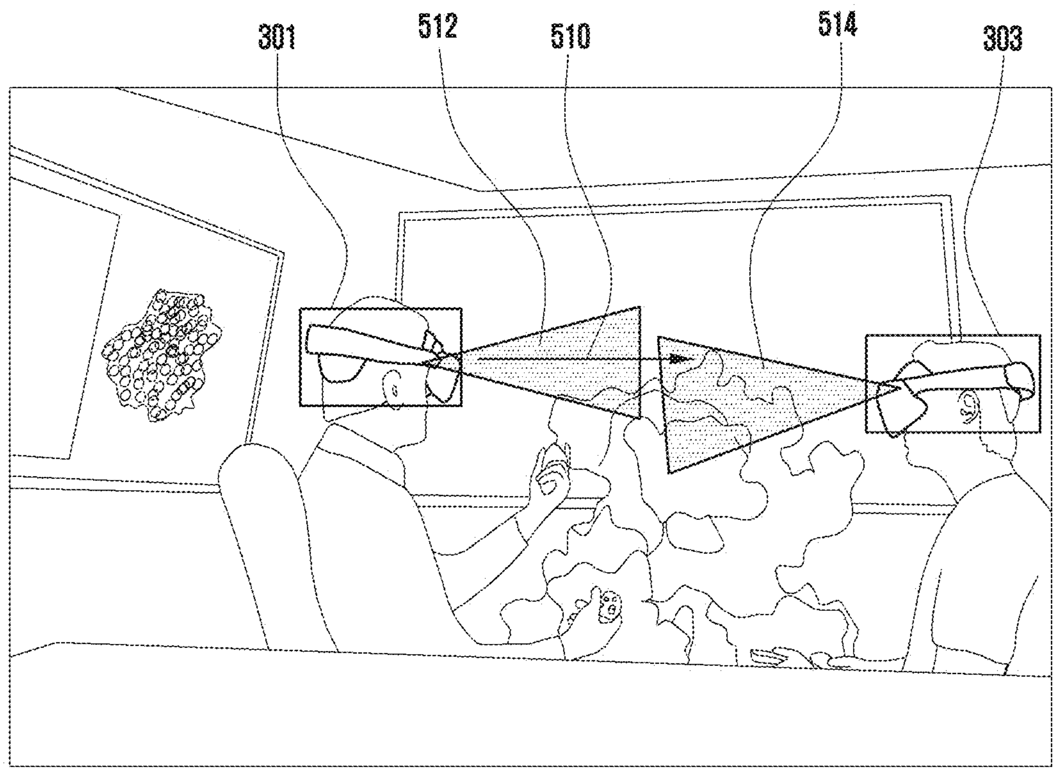
FIG. 5 is a diagram illustrating an example in which the electronic device operates in a second mode according to various embodiments.

FIG. 5 is a diagram illustrating an example which the electronic device 301 operates in a second mode according to various embodiments.

According to an embodiment, the second mode may include a see-through mode. The see-through mode may include a mode in which a user actually observes situations occurring in the surroundings captured by a camera and has a conversation or a conference with another user in the same space. The see-through mode may include, for example, a situation that requires translation of the voice of a user of another external electronic device when voice signals are exchanged with the user of the other external electronic device.

According to an embodiment, a processor (e.g., the processor 350 of FIG. 3) may display information (e.g., a translation) appropriate for a user of the electronic device 301 while the electronic device 301 operates in the second mode. According to an embodiment, when interpretation or translation is required, the processor 350 may receive voices around the user of the electronic device 301 via a microphone, and may display, to the user, information obtained by translating text corresponding to the voices around the user using the display 330.

According to an embodiment, the see-through mode may include a mode for displaying, to a user, the scene of the surroundings captured using a camera as it is, and analyzes and processes information associated with voices or a real space around the user for display. According to an embodiment, in the case of operation in the see-through mode, the processor 350 may deactivate noise cancelling in order to provide the information associated with a real space as it is. According to an embodiment, other user devices may be present within a designated distance from a space where the electronic device 301 is located, and thus the processor 350 may amplify ambient sound and may control so that howling does not occur between external electronic devices 303 (e.g., VST device). Hereinafter, descriptions are provided on the assumption that the external electronic device 303 is a VST device, the type of an external electronic device is not limited thereto. Howling refers to a phenomenon in which, when a voice coming from one VST device is reproduced via a speaker of the other VST device, the voice is input again into a microphone of the other VST device and is amplified and noise is provided.

According to an embodiment, in the case of operation in the second mode or see-through mode, the processor 350 may deactivate noise cancelling in order to receive an external sound. According to an embodiment, the processor 350 may operate a lower end microphone to receive a user voice signal and may also operate another microphone to receive a voice signal of another user at the same time. For example, another microphone may be a microphone different from the lower end microphone. For example, another microphone is to receive a voice signal of a user of another VST device 303, and may be a microphone relatively close to the user of the other VST device 303. According to an embodiment, the processor 350 may operate a plurality of microphones based on the number of users and/or the locations of at least one other VST device located within a predetermined distance from the electronic device 301. For example, the processor 350 may select and operate some of the plurality of microphones based on the location of a user. In the situation in which one user of another VST device is detected on the left side relative to the location of the electronic device 301, and two users of other VST devices are detected on the right side, the processor 350 may operate microphones disposed on the left and right sides. This is merely an example, and the number of users or the locations of other VST devices are not limited thereto.

According to an embodiment, based on the location of the other VST device 303 located within a designated distance from the electronic device 301, the processor 350 may change microphones to operate. Based on the direction of the electronic device 301 (e.g., the direction of a camera (e.g., the camera 325 of FIG. 3) of the electronic device 301) or a display (e.g., the direction of the display 330 of FIG. 3), the processor 350 may configure a beamforming direction of a signal output from a speaker to a direction 510 directed to a partner.

For example, given that the other VST device 303 is located (or disposed) on the right side relative to the electronic device 301, the processor 350 may operate a microphone located (or disposed) in a relatively rightmost part of the electronic device 301. The processor 350 may operate a microphone located in a relatively rightmost part of the electronic device 301 so as to perform beamforming in a predetermined direction 512 relative to the location of the mouth of a partner.

For example, given that the location of the other VST device 303 is moved to the left side relative to the electronic device 301, the processor 350 may suspend operation of a microphone located (or disposed) in a relatively rightmost part of the electronic device 301, and may operate a microphone located (or disposed) in a relatively leftmost part of the electronic device 310. For example, given that other VST devices are located on the left and right sides relative to the electronic device 301, the processor 350 may operate a microphone located in a relatively rightmost part of the electronic device 301 and a microphone located in a relatively leftmost part. Based on locations and the number of external VST devices, the processor 350 may determine a microphone to operate.

According to an embodiment, in the situation in which the user of the electronic device 301 is in the state of having a seat, and a user of another VST device 303 is in the state of standing up, the processor 350 may operate a microphone located relatively close to the forehead of the user of the electronic device 301. For example, the processor 350 may also operate a microphone located relatively close to the mouth of the user of the electronic device 301 at the same time. The other VST device 303 may also perform beamforming in a direction 514 directed to the electronic device 301.

According to an embodiment, in the case of operation in a third mode, the processor 350 may control the number of microphones to receive signals, and the number of channels to output signals.

According to an embodiment, the third mode may refer to a mode for interacting with the external electronic device 303 existing within a predetermined distance from the electronic device 301 and an external electronic device existing in a different space from the electronic device 301. For example, the third mode may refer to an operation mode of the processor 350 in the situation in which a user of the other VST device 303 participates in a conference in a real space within a predetermined distance from the electronic device 301 and a user of another VST device (not illustrated) in a virtual space participates in the conference at the same time. In the case of operation in the third mode, the processor 350 may apply characteristics when operation is performed in the first mode (virtual mode) in consideration of the user of the other VST device (not illustrated) in the virtual space and, at the same time, may apply characteristics when operation is performed in the second mode (see-through mode) in consideration of the user of the other VST device 303 in the real space, so as to manage a microphone to receive an external signal and a channel to output a signal.

According to an embodiment, the processor 350 may cancel howling between devices while the electronic device 301 operates in the third mode. For example, howling cancellation in the third mode is performed in consideration of the user of the other VST device 303 in the real space. For example, the processor 350 may deactivate noise cancelling in consideration of the user of the other VST device 303 in the real space. For example, the processor 350 may display the real space captured by a camera in order to display the user of the other VST device 303 in the real space and, simultaneously, display, in the real space, the user of the other VST device (not illustrated) that participates in the conference in the virtual space.

According to an embodiment, the processor 350 may operate a microphone based on the location of the user of the other VST device 303 in the real space, and may operate a microphone based on the location of the mouth of the user of the electronic device 301. In addition, in the case of entry to the virtual space, the processor 350 may activate noise cancelling and may cancel howling between the devices.

According to an embodiment, in the situation in which a voice input of a user of the other VST device 303 in the real space is detected, the processor 350 may deactivate noise cancelling, and may cancel howling between the devices. In the situation in which a voice input of a user of the other VST device 303 in the virtual space is detected, the processor 350 may activate noise cancelling, and may not cancel howling between devices.

According to an embodiment, in the situation in which a voice input of the user of the other VST device 303 in the real space is detected, the processor 350 may operate a microphone based on the location of the user of the other VST device 303 in the real space and, at the same time, may operate a microphone based on the location of the mouth of the user of the electronic device 301. In the situation in which a voice input of a user of another VST device (not illustrated) in the virtual space is detected, the processor 350 may operate only a microphone that is closest to the mouth of the user of the electronic device 301 based on the location of the mouth of the user of the electronic device 301.

In the situation in which a voice input of the user of the other VST device 303 in the real space and a voice input of a user of another VST device (not illustrated) in the virtual space are detected together, the processor 350 may deactivate noise cancelling and cancel howling between the devices.

In the case in which partners are present in both a virtual space and a real space, the processor 350 may operate the third mode. In the case of operation of the third mode, the processor 350 may operate a microphone disposed in the direction of the mouth of a user and, at the same time, may operate a microphone disposed in the direction of the front side relative to the electronic device 301. The processor 350 may amplify a user voice using the microphone in the direction of the mouth of the user, and may transfer the same to a partner whom the user is having a call with in the virtual space. The processor 350 may provide other functions including receiving, and amplifying and/or interpreting or translating a voice of another partner located in the real space using the microphone disposed in the front side.

According to an embodiment, the processor 350 in the third mode may activate an active noise cancellation (ANC) function, may deactivate an ambient sound listening mode, and may activate a howling cancellation function.

The ambient sound listening mode may be a mode that amplifies an external sound so that a user easily listens to the sound. Active noise cancellation (ANC) may be a function that blocks external sounds, which is different from the ambient sound listening mode.

A noise suppressor may cancel noise for a partner with whom a user is having a call. The processor 350 may distinguish a user voice and other signals among the signals input to a microphone. The processor 350 may preserve a signal corresponding to a user voice, and may remove other signals different from a user voice using a noise suppressor. The processor 350 may use a noise suppressor to perform control so as to transfer only a user voice to a partner whom the user is having a call with, and not to transfer noise different from a user voice.

Figure 6:
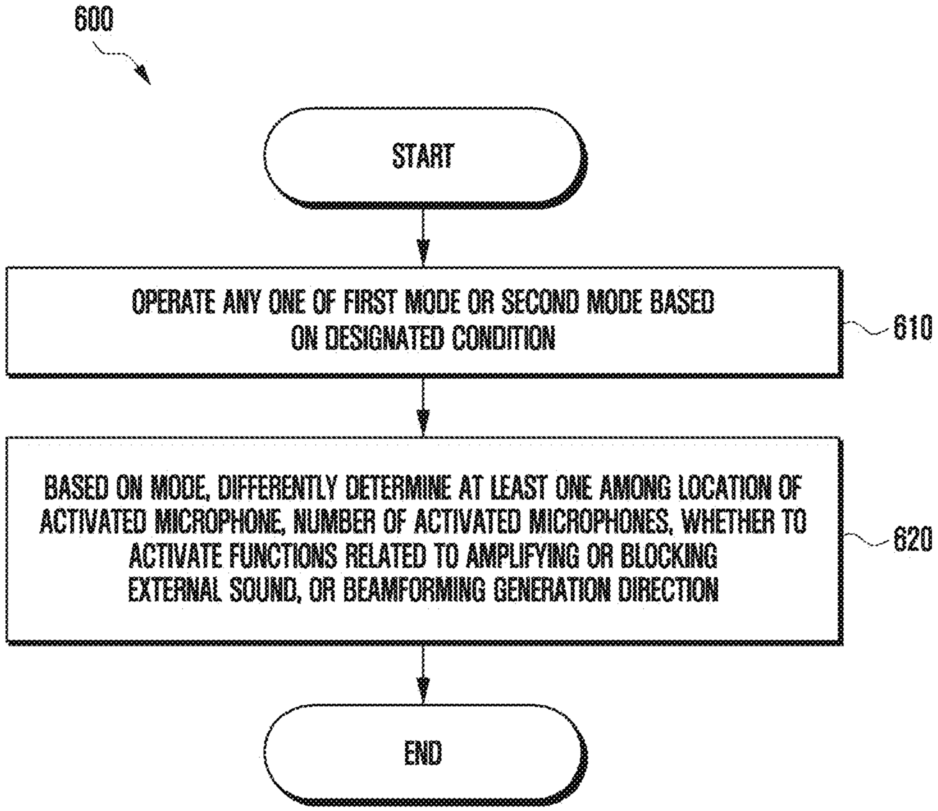
FIG. 6 is a flowchart illustrating an example audio signal output control method of an electronic device according to various embodiments.

FIG. 6 is a flowchart illustrating an example audio signal output control method of an electronic device according to various embodiments.

Operations described with reference to FIG. 6 may be embodied based on instructions that may be stored in a computer recoding medium or memory (e.g., the memory 130 of FIG. 1). An illustrated method 600 may be implemented by an electronic device (e.g., the electronic device 301 of FIG. 3) which has been described with reference to FIGS. 1 to 5, and, hereinafter, the technical features that have been described will be omitted. The order of operations in FIG. 6 may be changeable, some operations may be omitted, and some operations may be performed in parallel.

In operation 610 of FIG. 6, according to a designated condition, a processor (e.g., the processor 350 of FIG. 3) may operate any one operation mode between a first mode for displaying a virtual space on a display (e.g., the display 330 of FIG. 3) or second mode for displaying a screen captured using a camera (e.g., the camera 325 of FIG. 3) on the display.

According to an embodiment, the first mode may include a virtual mode. The virtual mode may include a mode for performing a game or a call or conference with another user in a virtual space. In the case of a virtual mode, the processor 350 may determine a signal generated around a user as noise, excluding a user voice. The processor 350 may limit a signal input to a microphone (e.g., the first microphone 211 and/or the second microphone 221 of FIG. 2A) to a user voice, and may activate noise cancelling.

According to an embodiment, the second mode may include a see-through mode. The see-through mode may include a mode in which a user actually observes surroundings captured by the camera 325 and has a conversation or a conference with another user in the same space. The see-through mode, for example, may include a situation that requires interpretation or translation.

In operation 620 of FIG. 6, based on operation of one of the first mode or the second mode, the processor 350 may differently determine the location of a microphone to be activated to input an external signal among a plurality of microphones (e.g., the first microphone 211 and/or the second microphone 221 of FIG. 2A) disposed in the electronic device 301, and may differently determine the number of microphones to be activated to input an external signal among the plurality of microphones disposed in the electronic device 301. The processor 350 may differently determine whether to activate functions related to amplifying or blocking an external sound, and may differently determine a beamforming generation direction for receiving a voice signal via a microphone.

According to an embodiment, based on operation in the first mode, the processor 350 may activate a microphone disposed in a location relatively closest to the mouth of a user in a state where the user wears the electronic device 301. The first mode may refer to a mode for performing communication with another user in a virtual space. The processor 350 may activate a microphone disposed in a location relatively closest to the mouth of a user so as to enable only a user voice of the electronic device 301 to be input to the microphone and to block an external sound when performing communication with another user in the virtual space. In addition, the processor 350 may deactivate microphones disposed in the remaining locations.

According to an embodiment, based on the operation in the first mode, the processor 350 may deactivate a function of amplifying an external sound input to the microphone, and may perform reproduction together with a waveform of an opposite phase of a waveform of the external sound input to the microphone so as to decrease output of the external sound. The processor 350 may block an external sound when performing communication with another user in the virtual space.

According to an embodiment, based on the operation in the first mode, the processor 350 may determine a beamforming generation direction relative to the direction of the mouth of a user so as to receive input of a sound from the mouth of the user. The processor 350 may determine a beamforming generation direction relative to the direction of the mouth of the user in order to transfer only a user voice to a partner when performing communication with another user in a virtual space, and to block the remaining external sounds. The processor 350 may perform control so that beamforming is generated relative to the direction of the mouth of the user, and only a user voice is input to a microphone and the remaining external sounds are not input.

According to an embodiment, based on operation in the second mode, the processor 350 may activate a microphone disposed in a location relatively closest to the mouth of a user in a state where the user wears the electronic device 301 and, at the same time, may activate a microphone disposed foremost from the user who wears the electronic device 301. The second mode may refer to a mode for communicating with a user of another head mounted display (HMD) device within a predetermined distance from the location of the electronic device 101 in a real space, instead of a virtual space. In this instance, the processor 350 may operate a front side microphone disposed closest to another user, in addition to a lower end microphone disposed relatively closest to the mouth of a user.

The electronic device 101 may receive a user voice of the other HMD device using the front side microphone, and may display the user voice in a text form on the display 330. In addition, the electronic device 101 may translate the language of the other user and may display the translate. The processor 350 may deactivate the microphones disposed in the remaining locations, excluding the lower end microphone and the front side microphone.

According to an embodiment, based on the operation in the second mode, the processor 350 may perform reproduction together with a waveform of the same phase as that of a waveform of an external sound input to a microphone so as to amplify output of the external sound.

According to an embodiment, based on the operation in the second mode, the processor 350 may determine a beamforming generation direction based on the direction of the mouth of a user so as to receive input of a sound from the mouth of the user in a state where the user wears electronic device. In addition, to receive input of a sound of a partner in a state where the user wears the electronic device, the processor 350 may generate beamforming in the front side direction relative to the user.

The processor 350 may generate beamforming based on the direction of the mouth of the user, and perform control so as to enable a user voice to be input to a microphone. The processor 350 may generate beamforming in the front direction from the user so as to receive a user voice of another HDM device located in the real space.

According to an embodiment, based on the operation in the second mode, the processor 350 may operate a function of cancelling howling in the state in which an external device (e.g., an HMD device) is located within a designated distance from the electronic device 301. Howling may refer to a feedback phenomenon that occurs when audio output from an external device is input to a microphone of the electronic device 301.

According to an embodiment, based on the operation in the second mode, the processor 350 may detect whether another external device is present within a designated distance from the location of the electronic device 301, may compare at least one among the magnitudes, phases, or arrival times of signals received by the electronic device 301, and may determine the location of a partner. With reference to the location of the user of the other electronic device, the processor 350 may determine the location of a microphone to be activated to receive input of an external signal among a plurality of microphones disposed in the electronic device 301. The processor 350 may activate a microphone in a direction close to the user of the external device, and may deactivate the microphones in the remaining locations.

According to an embodiment, in the situation in which operation is performed in the first mode and communication is performed with a user of a first external device in a virtual space and, at the same time, and communication is performed with a user of a second external device within a predetermined distance in a real space, the processor 350 may determine the location of a microphone to be activated. The processor 350 may activate a microphone disposed in a location relatively closest to the mouth of a user in a state where the user wears the electronic device, may activate a microphone disposed foremost from the user who wears the electronic device, and may deactivate the microphones disposed in the remaining locations. The processor 350 may deactivate a function of amplifying an external sound input to a microphone, may perform reproduction together with a waveform of an opposite phase based on a waveform of the external sound input to the microphone so as to decrease output of the external sound, and may operate a function of cancelling howling. Howling may refer to a feedback phenomenon that occurs when audio output from a second external device is input to a microphone of the electronic device.

According to an embodiment, in the case of operation in the first mode or virtual mode, the processor 350 may activate noise cancelling in order to block an external sound, and may block noise received in the electronic device 301. In the case of the operation in the first mode, the processor 350 may operate a microphone (e.g., a lower end microphone) disposed closest to a user in relation to the electronic device 301. A lower end microphone in relation to the electronic device 301 may be a microphone relatively closest to the mouth of a user. In the case of the operation in the first mode, the processor 350 may operate a lower end microphone relative to the electronic device 301, and may provide an environment where a user voice is received within the closest distance and/or noise from the outside is not received by the microphone. A lower end microphone may be, for example, the first microphone 211 and/or the second microphone 221 of FIG. 2A.

According to an embodiment, in the case of operation in the second mode, the processor 350 may receive a sound around a user via a microphone and may display translated information to the user. The see-through mode may include a mode for displaying, to a user, the scene of the surroundings captured using a camera as it is, and may analyzes and processes information associated with voices or a real space around the user for display. In the case of operation in the see-through mode, the processor 350 may deactivate noise cancelling in order to provide the information associated with a real space as it is. According to an embodiment, other user devices may be present within a designated distance from a space where the electronic device 301 is located, and thus the processor 350 may amplify an ambient sound and may control so that howling does not occur between VST devices.

According to an embodiment, a designated condition may include at least one among whether a camera capturing the outside is operated, whether a designated application capable of utilizing a virtual space is executed, whether entry to a designated area occurs, or a user selection. For example, based on a user selection, the processor 350 may operate any one operation mode between a first mode for displaying a virtual screen on the display or a second mode for displaying a screen captured using the camera on the display. For example, based on execution of a designated application capable of utilizing a virtual space, the processor 350 may execute the first mode for displaying a virtual screen on the display, and based on non-execution of a designated application capable of utilizing a virtual space, the processor 350 may execute the second mode for displaying a screen captured using the camera on the display. For example, given that the electronic device 301 is located in a previously designated area, the processor 350 may execute the first mode for displaying a virtual screen on the display 330. Given that the electronic device 301 is not located in a previously designated area, the processor 350 may execute the second mode for displaying a screen captured using the camera 325 on the display 330.

According to an embodiment, given that the first mode for displaying a virtual screen on the display is selected, the processor 350 may activate active noise cancellation (ANC) so as to block noise around the electronic device, may operate a microphone located closest to the mouth of a user of the electronic device, and may configure a direction in which a signal of an audio output circuit is output to a lower end relative to the location of the mouth of the user of the electronic device.

According to an embodiment, given that the second mode for displaying a screen captured using the camera is selected, the processor 350 may suspend operation of active noise cancellation (ANC), so as to perform control not to block an external sound around the electronic device, and may detect whether another external device is present within a designated distance from the location of the electronic device. The processor 350 may operate a microphone closest to the location of a user of the other external device among microphones disposed in the electronic device. The processor 350 may configure a direction in which a signal of the audio output circuit is output to the front side in relation to the location of the mouth of the user of the electronic device, and may cancel howling occurring between a voice signal output from the external device and a voice signal output from the electronic device.

According to an embodiment, given that another VST device is located on the right side of the electronic device, the processor 350 may operate a microphone located in a relatively rightmost part of the electronic device. Given that the location of the other VST device is moved to the left side of the electronic device, the processor 350 may suspend operation of the microphone located in the relatively rightmost part of the electronic device, and may operate a microphone located in a relatively leftmost part.

According to an embodiment, given that a communication connection to a user of another video see-through (VST) device located within a predetermined distance from the electronic device is established and, at the same time, a communication connection to another VST device in a virtual space is established, the processor 350 may deactivate an ambient noise cancellation function and may operate active noise cancellation (ANC). The active noise cancellation (ANC) may refer to a function of blocking an ambient sound for a user of the electronic device 101. Ambient noise cancellation may be a function that blocks noise around the electronic device 101 so that the noise is not mixed with audio, for a user of another VST device. The processor 350 may cancel howling occurring between a voice signal output from another VST device and a voice signal output from the electronic device. The processor 350 may operate a plurality of microphones including a microphone closest to the location of the mouth of a user and a microphone closest to the location of the mouth of a partner among a plurality of microphones included in the electronic device, and may configure a direction in which a signal of an audio output circuit is output to a lower end in relation to the location of the mouth of the user of the electronic device, thereby receiving two signal channels.

According to an embodiment, in the situation in which a voice input of a user of an external electronic device adjacent to the electronic device in a real space is detected, the processor 350 may deactivate noise cancelling, and may cancel howling between the devices. The processor 350 may activate noise cancelling with respect to a voice of another user that accesses a virtual space and performs communication via another external electronic device, and does not apply howling cancellation between the devices. In the situation in which a voice input of a user of an external electronic device adjacent to the electronic device is detected, the processor 350 may operate a microphone based on the location of the external electronic device adjacent to the electronic device and, at the same time, may operate a microphone based on the location of the mouth of a user of the electronic device 301. In the situation in which a voice input of a user of another external electronic device that accesses the virtual space and performs communication is detected, the processor 350 may operate a microphone closest to the mouth of the user of the electronic device 301 based on the location of the mouth of the user of the electronic device 301.

According to an embodiment, given that the second mode for displaying an actual screen recognized by the camera is selected, the processor 350 may suspend operation of an active noise cancellation (ANC), may perform control not to block an external sound around the electronic device, and may amplify an external sound and/or recognize and translate an external sound for display.

According to an embodiment, the processor 350 may detect whether another external device is present within a designated distance from the location of the electronic device 301, may compare at least one among the magnitudes, phases, or arrival times of signals received by a plurality of microphones, and may determine the location of a partner. The processor 350 may operate a closest microphone relative to the location of a user of another external electronic device among the plurality of microphones disposed in the electronic device, may configure a direction in which a signal of an audio output circuit is output to the front side relative to the location of the mouth of a user of the electronic device, and may cancel howling between a voice signal output from an external device and a voice signal output from the electronic device. Given that another VST device is located on the right side of the electronic device 301, the processor 350 may operate a microphone located in a relatively rightmost part of the electronic device 301. Given that the location of the other VST device is moved to the left side of the electronic device 301, the processor 350 may suspend operation of the microphone located in the relatively rightmost part of the electronic device 301, and may operate a microphone located in a relatively leftmost part.

According to an embodiment, based on operation in the second mode, the processor 350 may operate a function of cancelling howling in the state in which an external device is located within a designated distance from the electronic device.

According to an embodiment, based on the operation in the second mode, the processor 350 may detect whether another external electronic device is present within a designated distance from the location of the electronic device, may compare at least one among magnitudes, phases, or arrival times of signals received in the electronic devices so as to determine the location of a partner, and may determine, based on the location of a user of the other external device, the location of a microphone to be activate for inputting an external signal among a plurality of microphones disposed in the electronic device.

According to an embodiment, a designated condition for operating any one mode between the first mode or the second mode may include at least one among a user selection, whether a camera capturing the outside is operated, whether a designated application capable of utilizing a virtual space is executed, whether entry to a designated area occurs, or a user selection.

According to an embodiment, given that the electronic device is located within a previously designated area, the processor 350 may execute the first mode for displaying a virtual screen on the display. Given that the electronic device is not located within a previously designated area, the processor 350 may execute the second mode for displaying an actual screen recognized by the camera.

According to an embodiment, in the situation of operating in the first mode and performing communication with a user of a first external device in a virtual space and, parallelly, communicating with a user of a second external device located within a designated distance in a real space, the processor 350 may activate a microphone disposed in a location relatively closest to the mouth of a user in a state where the user wears the electronic device, and may activate a microphone disposed foremost from the user who wears the electronic device. In addition, in the same situation, the processor 350 may deactivate microphones disposed in the remaining locations, may deactivate a function of amplifying an external sound input to a microphone, may perform reproduction together with a waveform of an opposite phase based on a waveform of the external sound input to the microphone so as to decrease output of the external sound, and may operate a function of cancelling howling.

According to an embodiment, the electronic device 101 may include a head mounted display (HMD) device that is mounted on the head of a user and displays virtual reality or augmented reality.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

a display disposed around an eye of a user based on being worn on a body part;

a plurality of microphones disposed at different locations and configured to receive an audio signal including voice signals and external sounds;

a camera;

a speaker configured to reproduce an audio signal;

at least one processor, comprising processing circuitry; and memory storing instructions and comprising one or more storage media;

wherein the instructions, when individually or collectively executed by at least one processor, cause the electronic device to:

operate one of a first mode or a second mode according to a designated condition, the first mode configured to display a virtual space on the display and the second mode configured to display a real space captured via the camera on the display; and based on operation of one of the first mode or the second mode:

determine which microphones among the plurality of microphones to activate, selectively activate functions related to amplifying or blocking an external sound in the received audio signal, and determine a different beamforming direction for receiving a voice signal in the received audio signal via at least one of the microphones.

2. The electronic device of claim 1, wherein at least one processor, individually and/or collectively, is configured to control the electronic device to:

based on operation in the first mode:

activate a microphone disposed in a location relatively closest to the mouth of the user in a state of the user wearing the electronic device;

deactivate microphones disposed in remaining locations;

deactivate a function of amplifying an external sound in the received audio signal;

decrease output of the external sound by performing reproduction together with a waveform of an opposite phase based on a waveform of the external sound in the received audio signal; and determine a beamforming direction based on a direction of the mouth of the user to receive input of a sound output from the mouth of the user in a state of the user wearing the electronic device.

3. The electronic device of claim 1, wherein at least one processor, individually and/or collectively, is configured to control the electronic device to:

based on operation in the second mode:

activate a microphone disposed in a location relatively closest to the mouth of the user in a state of the user wearing the electronic device;

activate a microphone disposed foremost from the user wearing the electronic device;

deactivate microphones disposed in remaining locations;

amplify output of an external sound by performing reproduction together with a waveform of the same phase based on a waveform of the external sound in the received audio signal;

determine a beamforming direction based on a direction of the mouth of the user to receive input of a sound output from the mouth of the user in a state of the user wearing the electronic device; and generate beamforming in a forward direction from the user to receive input of a sound of a partner of the user in a state of the user wearing the electronic device.

4. The electronic device of claim 3, wherein at least one processor, individually and/or collectively is configured to control the electronic device to:

based on the operation in the second mode, operate a function of cancelling howling in a state in which an external device is located within a designated distance from the electronic device, and wherein howling includes a feedback phenomenon occurring based on audio output from the external device being input to a microphone of the electronic device.

5. The electronic device of claim 1, wherein at least one processor, individually and/or collectively is configured to control the electronic device to:

based on operation in the second mode:

detect whether another external device is present within a designated distance from a location of the electronic device;

determine a location of a user of the another external device by comparing at least one among magnitudes, phases, or arrival times of signals received in the electronic device; and with reference to the location of the user of the another external device, determine a location of a microphone to be activated to input an audio signal among the plurality of microphones disposed in the electronic device.

6. The electronic device of claim 1, wherein the designated condition for operating one of the first mode or the second mode comprises at least one among a user selection, whether a camera capturing the outside is operated, whether a designated application capable of utilizing a virtual space is executed, and/or whether entry to a designated area occurs.

7. The electronic device of claim 1, wherein at least one processor, individually and/or collectively, is configured to control the electronic device to:

execute the first mode for displaying a virtual screen on the display based on execution of a designated application capable of utilizing a virtual space; and execute the second mode for displaying, on the display, an actual screen recognized by the camera based on non-execution of a designated application capable of utilizing a virtual space.

8. The electronic device of claim 1, wherein at least one processor, individually and/or collectively, is configured to control the electronic device to:

based on the electronic device being located in a previously designated area, execute the first mode for displaying a virtual screen on the display; and based on the electronic device not being located in a previously designated area, execute the second mode for displaying, on the display, an actual screen recognized by the camera.

9. The electronic device of claim 1, wherein at least one processor, individually and/or collectively, is configured to control the electronic device to:

based on operating in the first mode to perform communication with a user of a first external device in a virtual space and, parallelly, perform communication with a user of a second external device located within a designated distance in a real space:

activate a microphone disposed in a location relatively closest to the mouth of a user in a state of the user wearing the electronic device;

activate a microphone disposed foremost from the user wearing the electronic device;

deactivate microphones disposed in remaining locations;

deactivate a function of amplifying an external sound in the received audio signal;

decrease output of the external sound by performing reproduction together with a waveform of an opposite phase based on a waveform of the external sound in the received audio signal; and operate a function of cancelling howling, and wherein howling includes a feedback phenomenon occurring based on audio output from the second external device being input to a microphone of the electronic device.

10. The electronic device of claim 1, wherein the electronic device comprises a head mounted display (HMD) device configured to be mounted on the head of a user and to display virtual reality or augmented reality.

11. A method of operating an electronic device, comprising:

receiving an audio signal including voice signals and external sounds via at least one microphone among a plurality of microphones of the electronic device disposed at different locations;

operating one of a first mode or a second mode according to a designated condition, the first mode displaying a virtual space on a display of the electric device and the second mode displaying, on the display, a real space captured by a camera of the electronic device; and based on operation of one of the first mode or the second mode, determining which microphones among the plurality of microphones to activate, selectively activating functions related to amplifying or blocking an external sound in the received audio signal, and determining a different beamforming direction for receiving a voice signal in the received audio signal via at least one of the microphones.

12. The method of claim 11, further comprising, based on operation in the first mode:

activating a microphone disposed in a location relatively closest to the mouth of a user in a state of the user wearing the electronic device;

deactivating microphones disposed in remaining locations;

deactivating a function of amplifying an external sound in the received audio signal;

decreasing output of the external sound by performing reproduction together with a waveform of an opposite phase based on a waveform of the external sound in the received audio signal; and determining a beamforming direction based on a direction of the mouth of the user to receive input of a sound output from the mouth of the user in a state of the user wearing the electronic device.

13. The method of claim 11, further comprising, based on operation in the second mode:

activating a microphone disposed in a location relatively closest to the mouth of a user in a state of the user wearing the electronic device;

activating a microphone disposed foremost from the user wearing the electronic device, and deactivating microphones disposed in remaining locations;

amplifying output of an external sound by performing reproduction together with a waveform of the same phase based on a waveform of the external sound in the received audio signal;

determining a beamforming direction based on a direction of the mouth of the user to receive input of a sound output from the mouth of the user in a state of the user wearing the electronic device; and generating beamforming in a forward direction from the user to receive input of a sound of a partner of the user in a state of the user wearing the electronic device.

14. The method of claim 13, further comprising:

based on the operation in the second mode, operating a function of cancelling howling in a state in which an external device is located within a designated distance from the electronic device, wherein howling includes a feedback phenomenon occurring based on audio output from the external device being input to a microphone of the electronic device.

15. The method of claim 11, further comprising, based on operation in the second mode:

detecting whether another external device is present within a designated distance from a location of the electronic device;

determining a location of a user of the another external device by comparing at least one among magnitudes, phases, or arrival times of signals received in the electronic device; and with reference to the location of the user of the another external device, determining a location of a microphone to be activated to input an audio signal among the plurality of microphones disposed in the electronic device.

* * * * *